United States Patent
Byun et al.

(10) Patent No.: US 8,974,935 B2
(45) Date of Patent: Mar. 10, 2015

(54) SECONDARY BATTERY MODULE

(75) Inventors: Sangwon Byun, Suwon-si (KR);
Sungbae Kim, Suwon-si (KR)

(73) Assignees: Samsung SDI Co., Ltd., Yongin-Si, Gyeonggi-Do (KR); Robert Bosch GmbH, Stuttgart (DE)

(*) Notice: Subject to any disclaimer, the term of this patent is extended or adjusted under 35 U.S.C. 154(b) by 959 days.

(21) Appl. No.: 12/659,109

(22) Filed: Feb. 25, 2010

(65) Prior Publication Data

US 2010/0215998 A1    Aug. 26, 2010

(30) Foreign Application Priority Data

Feb. 26, 2009 (KR) .................. 10-2009-0016325

(51) Int. Cl.
| | |
|---|---|
| *H01M 2/12* | (2006.01) |
| *H01M 2/10* | (2006.01) |
| *H01M 2/20* | (2006.01) |
| *H01M 2/36* | (2006.01) |

(52) U.S. Cl.
CPC .......... *H01M 2/1241* (2013.01); *H01M 2/1077* (2013.01); *H01M 2/1282* (2013.01); *H01M 2/206* (2013.01); *H01M 2/362* (2013.01)
USPC .................. 429/82; 429/72; 429/89; 429/149

(58) Field of Classification Search
USPC ............... 429/72, 82, 89, 96, 97, 98, 99, 100, 429/148, 149, 151, 153, 159, 163, 175, 176, 429/177, 186
See application file for complete search history.

(56) References Cited

U.S. PATENT DOCUMENTS

| | | | | |
|---|---|---|---|---|
| 5,800,942 | A * | 9/1998 | Hamada et al. | 429/148 |
| 5,906,899 | A * | 5/1999 | Noda et al. | 429/149 |
| 6,569,561 | B1 * | 5/2003 | Kimura et al. | 429/159 |
| 7,531,270 | B2 * | 5/2009 | Buck et al. | 429/120 |
| 2010/0216004 | A1 * | 8/2010 | Yoon | 429/99 |

FOREIGN PATENT DOCUMENTS

| | | |
|---|---|---|
| JP | 2001-023624 A | 1/2001 |
| JP | 2001-338628 A | 12/2001 |
| JP | 2008-091183 A | 4/2008 |
| JP | 2008-270032 A | 11/2008 |
| KR | 10 2006-0022359 A | 3/2006 |

(Continued)

OTHER PUBLICATIONS

Korean Office Action in KR 10-2009-0016325, dated Oct. 13, 2010 (Byun, et al.) Korean Office Action from prosecution of corresponding Korean application.

(Continued)

*Primary Examiner* — Carlos Barcena
(74) *Attorney, Agent, or Firm* — Lee & Morse, P.C.

(57) ABSTRACT

A secondary battery module including a plurality of secondary battery cells, each secondary battery cell including electrodes on one side thereof and a vent on the same side as the electrodes, a module frame coupled to the plurality of secondary battery cells and fixing the secondary battery cells in a predetermined arrangement, the module frame including a plurality of vent holes corresponding to the vents of the secondary battery cells, and protrusions disposed around the vent holes and protruding toward the vents, wherein each vent of the secondary battery cells is coupled to one of the protrusions of the module frame.

15 Claims, 6 Drawing Sheets

(56) References Cited

FOREIGN PATENT DOCUMENTS

| | | | |
|---|---|---|---|
| KR | 10 2006-0037599 A | 5/2006 | |
| KR | 10-0649568 B1 | 11/2006 | |

OTHER PUBLICATIONS

Korean Notice of Allowance in KR 10-2009-0016325, dated Jun. 16, 2011 (Byun, et al.).

* cited by examiner

SECONDARY BATTERY MODULE

BACKGROUND

1. Field

Embodiments relate to a secondary battery module.

2. Description of the Related Art

In recent years, electric vehicles and hybrid electric vehicles have been spotlighted as a solution to air pollution caused by, e.g., gasoline vehicles and diesel vehicles that use existing fossil fuels. Electric vehicles and hybrid electric vehicles use batteries in order to drive motors and particularly use easily chargeable and rechargeable secondary batteries. The batteries are required to supply voltage and power sufficient to drive the motors. As a result, batteries are used in the form of battery modules formed by, e.g., serially connecting a plurality of battery cells.

When the battery modules are fabricated using the battery cells, the battery modules must be arranged according to the polarities of the battery cells. If the polarity of even one battery cell is reversed, the performance of the battery module using the battery cells may deteriorate, thereby deteriorating reliability. In particular, in polygonal battery cells, since the shape of positive terminals of positive electrodes may be similar to those of negative terminals of negative electrodes, errors in arrangement of the terminals may easily occur.

SUMMARY

Embodiments are therefore directed to a secondary battery module, which substantially overcomes one or more of the problems due to the limitations and disadvantages of the related art.

It is therefore a feature of an embodiment to provide a secondary battery module with improved reliability.

It is therefore another feature of an embodiment to provide a secondary battery module that is easy to properly assemble.

At least one of the above and other features and advantages may be realized by providing a secondary battery module, including a plurality of secondary battery cells, each secondary battery cell including electrodes on one side thereof and a vent on the same side as the electrodes, a module frame coupled to the plurality of secondary battery cells and fixing the secondary battery cells in a predetermined arrangement, the module frame including a plurality of vent holes corresponding to the vents of the secondary battery cells, and protrusions disposed around the vent holes and protruding toward the vents, wherein each vent of the secondary battery cells is coupled to one of the protrusions of the module frame.

The secondary battery module may further include at least one bus bar disposed on the module frame and electrically connecting an electrode of one of the secondary battery cells to an adjacent electrode of an adjacent secondary battery cell.

Each electrode may have a polarity, and the secondary battery cells may be arranged such that the polarity of an electrode of one secondary battery cell is different from the polarity of an adjacent electrode on an adjacent secondary battery cell.

The secondary battery cells may each have a center, and the secondary battery cells may be arranged such that the vents are aligned in a zigzag fashion about the centers of the secondary battery cells.

The module frame may include a lower plate disposed under the secondary battery cells and supporting the secondary battery cells, an upper plate disposed above the secondary battery cells and including the vent holes and the protrusions, end plates disposed at ends of the secondary battery cells, and connection members connecting the lower plate, the upper plate and the end plates to each other and fixing the secondary battery cells in the predetermined arrangement.

The module frame may have an inner surface, and the protrusions of the module frame may protrude from the inner surface of the module frame toward the secondary battery cells.

The protrusions of the module frame may be fitted into the vents.

Each secondary battery cell may include upper lateral sides and the electrodes may be disposed on the upper lateral sides.

At least one of the above and other features and advantages may also be realized by providing a secondary battery module, including a plurality of secondary battery cells, each secondary battery cell including electrodes on one side thereof and an injection hole stopper on the same side as the electrodes, and a module frame coupled to the plurality secondary battery cells and fixing the secondary battery cells in a predetermined position, the module frame including a plurality of accommodating recesses corresponding to the injection hole stoppers of the secondary battery cells, wherein each injection hole stopper of the secondary battery cells is coupled to one of the accommodating recesses of the module frame.

The secondary battery module may further include at least one bus bar disposed on the module frame and electrically connecting an electrode of one of the secondary battery cells to an adjacent electrode of an adjacent secondary battery cell.

The secondary battery cells may each have a center and an upper side, each injection hole stopper may protrude from the upper side of each secondary battery cell, and the secondary battery cells may be arranged such that the injection hole stoppers are aligned in a zigzag fashion about the centers of the secondary battery cells.

The module frame may include a lower plate disposed under the secondary battery cells and supporting the secondary battery cells, an upper plate disposed above the secondary battery cells and including the accommodating recesses, end plates disposed at ends of the secondary battery cells, and connection members connecting the lower plate, the upper plate and the end plates to each other and fixing the secondary battery cells in the predetermined arrangement.

Each secondary battery cell may include a vent disposed adjacent to another of the electrodes, the module frame may include a plurality of vent holes corresponding to the vents of the secondary battery cells and protrusions disposed around the vent holes and protruding toward the vents, and each vent of each secondary battery cell may be coupled to one of the protrusions of the module frame.

The secondary battery cells may each have a center and an upper side, each injection hole stopper may protrude from the upper side of each secondary battery cell, and the secondary battery cells may be arranged such that the injection hole stoppers are aligned in a zigzag fashion about the centers of the secondary battery cells and the vents may be aligned in an opposite zigzag fashion about the centers of the secondary battery cells.

Each secondary battery cell may include upper lateral sides and the electrodes may be disposed on the upper lateral sides.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2009-0016325, filed on Feb. 26, 2009, in the Korean Intellectual Property Office, and entitled: "Secondary Battery Module and Method of Fabricating the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, exemplary embodiments will be described in detail with reference to the accompanying drawings. The configuration of a secondary battery module 1000 according to an embodiment will be described.

Figure 1:
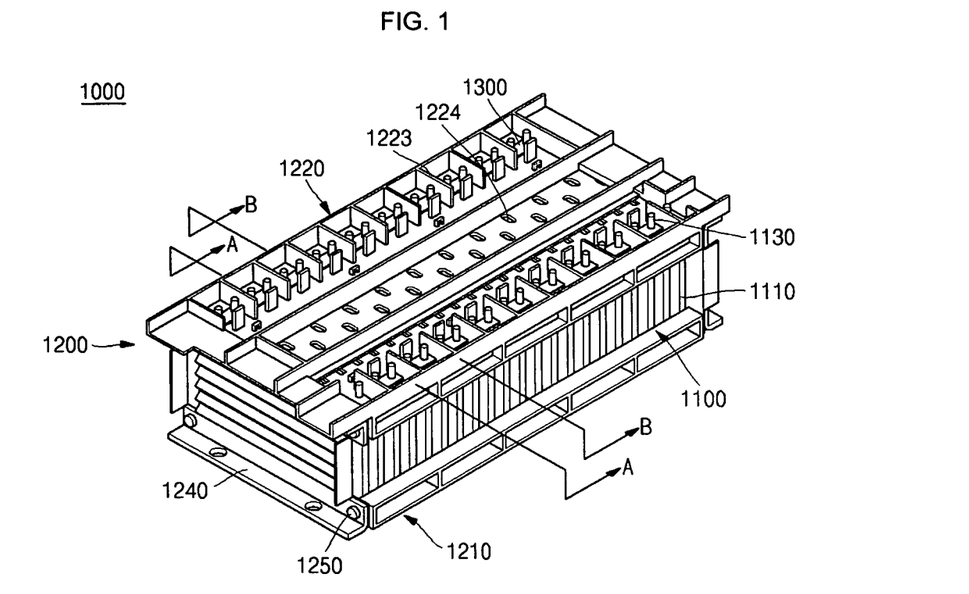
FIG. 1 illustrates a perspective view of a secondary battery module according to an embodiment.
Figure 2:
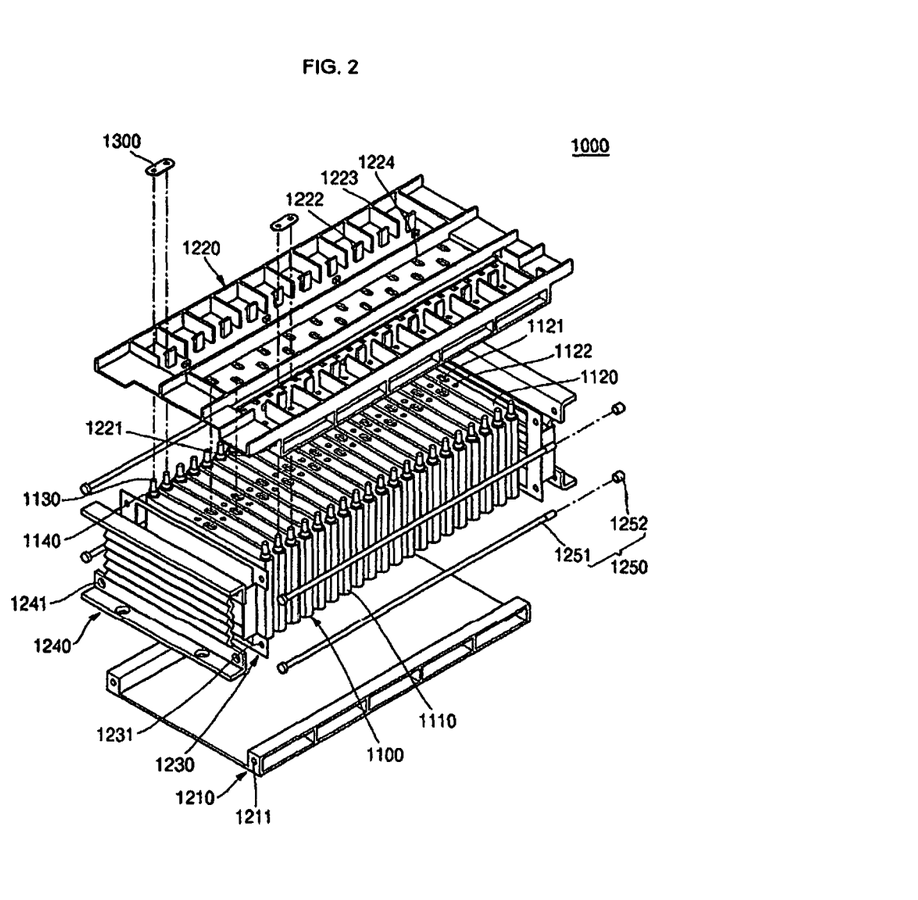
FIG. 2 illustrates an exploded perspective view of the secondary battery module according to an embodiment.
Figure 3A:
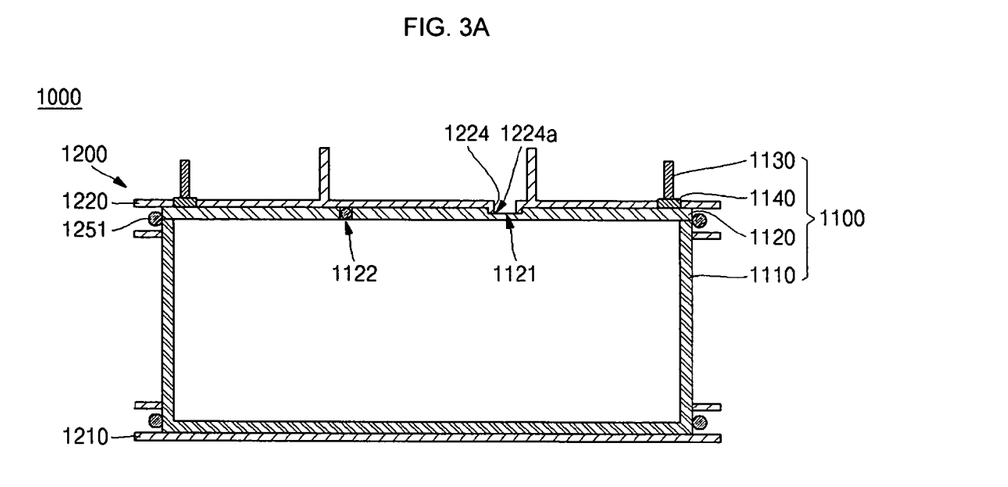
FIG. 3A illustrates a sectional view taken along the line A-A of FIG. 1.
Figure 3B:
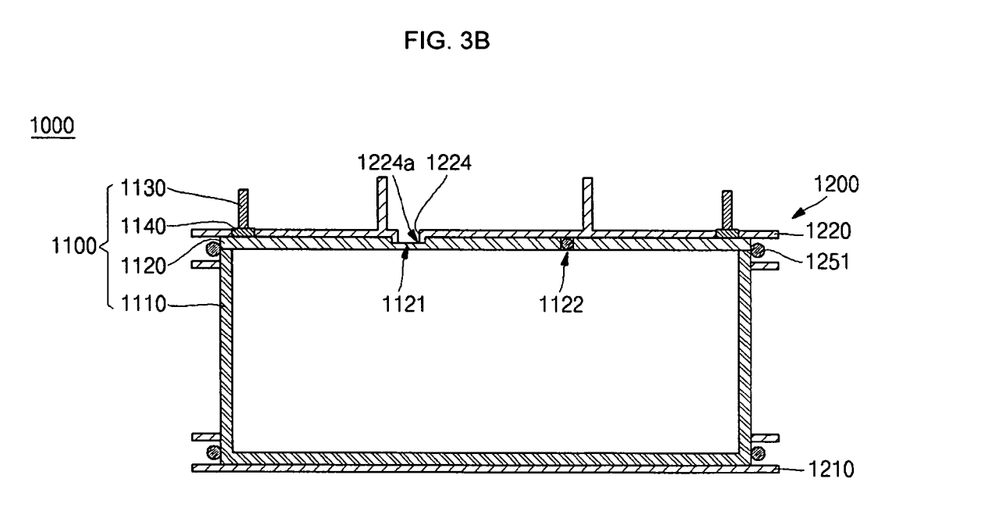
FIG. 3B illustrates a sectional view taken along the line B-B of FIG. 1.

FIG. 1 illustrates a perspective view of a secondary battery module according to an embodiment. FIG. 2 illustrates an exploded perspective view of the secondary battery module according to an embodiment. FIG. 3A illustrates a sectional view taken along the line A-A of FIG. 1. FIG. 3B illustrates a sectional view taken along the line B-B of FIG. 1.

Referring to FIGS. 1 to 3B, the secondary battery module 1000 according to an embodiment may include a plurality of secondary battery cells 1100, a module frame 1200 surrounding outsides of the secondary battery cells 1100 and bus bars 1300 coupled to an outside of the module frame 1200 to electrically connect the secondary battery cells 1100.

Each of the secondary battery cells 1100 may include a case 1110, an electrode assembly (not shown) in the case 1110, a plate 1120 sealing the case 1110, electrodes 1130 connected to the electrode assembly and exposed through the plate 1120 and nuts 1140 disposed where the electrodes 1130 and the plate 1120 contact each other. Insulation gaskets may be interposed between the nut 1140 and the plate 1120 to prevent electrical shorts.

The case 1110 may include, e.g., a metal layer or a resin layer, like a typical case of a secondary battery. Although not shown, the case 1110 may accommodate the electrode assembly and an electrolyte therein. The electrode assembly may include positive electrodes, negative electrodes, and separators between the positive electrodes and the negative electrodes. The electrolyte allows an electric current to flow, and may be formed by mixing, e.g., lithium salts, with a non-aqueous organic solvent.

The plate 1120 may seal the case 1110 to prevent the electrolyte from leaking. In each of the secondary battery cells 1100, a vent 1121 may be disposed on each of the plates 1120.

Each of the vents 1121 may vent gas generated in the secondary battery cell 1100 due to, e.g., increased temperature in the case 1110 or a voltage higher than an overcharge voltage. In other words, since the vents 1121 may be thinner than the other parts of the plates 1120, when the gas expands and applies pressure to the case 1110, the vents 1121 may open before other critical parts of the secondary battery cell 1100 are damaged. Therefore, the gas may be discharged through a hole (not shown) formed by opening the vent 1121 and, as a result, explosion of the secondary battery cell 1100 may be prevented.

Each vent 1121 may be disposed on the plate 1120 adjacent to one of the positive electrode or the negative electrode that form the electrodes 1130. When the secondary battery cells 1100 are properly arranged, the vents 1121 may thereby be arranged in a zigzag fashion about the centers of the secondary battery cells 1100. That is, the vents 1121 may be arranged opposite to each other in adjacent secondary battery cells 1100.

Each of the plates 1120 may further include an injection hole stopper 1122 disposed on the upper surface thereof. In the secondary battery cell 1100, the electrode assembly may be inserted into the case 1110, the case 1110 may be sealed with the plate 1120 and the electrolyte may be injected through injection hole in the plates 1120. The injection stopper 1122 may seal the injection hole to prevent the electrolyte in the case 1110 from leaking.

The electrodes 1130 may be connected to the electrode assembly and protrude above the plate 1120. The electrodes 1130 may include two terminals in each secondary battery cell 1100, a positive electrode and a negative electrode. The polarities of the electrodes 1130 may be determined by a potential difference determined by an oxidation-reduction reaction of ions, e.g., lithium ions. Also, as will be described below, the electrodes 1130 may be serially connected between the secondary battery cells 1100. In other words, adjacent secondary battery cells 1100 in an arrangement direction may be positioned such that the polarities of adjacent electrodes 1130 alternate relative to each other. The electrodes 1130 may be connected by the bus bars 1300 so that the secondary battery cells 1100 are electrically connected in series.

The nuts 1140 may be coupled to the electrodes 1130. The nuts 1140 may correspond to threads of the electrodes 1130 and may be engaged with the electrodes 1130 to fix the positions of the electrodes 1130. In addition, insulating members (not shown) may be disposed between the nuts 1140 and the plate 1120.

The module frame 1200 may be disposed outside the secondary battery cells 1100. The module frame 1200 may fix the position of the secondary battery cells 1100 and may protect the secondary battery cells 1100 against, e.g., external shock. The module frame 1200 may include a lower plate 1210 under the secondary battery cells 1100, an upper plate 1220 above the secondary battery cells 1100, a pair of end plates 1240 at ends of the arranged secondary battery cells 1100 and connection members 1250 coupling the lower plate 1210, the upper plate 1220 and the end plates 1240 to each other. In addition, gaskets 1230 may be disposed between the secondary battery cells 1100 and the end plates 1240.

The lower plate 1210 may be disposed under the secondary battery cells 1100. The lower plate 1210 may support lower sides of the secondary battery cells 1100. The lower plate 1210 may have holes 1211 disposed in a longitudinal direction substantially parallel to the arrangement direction of the secondary battery cells 1100. Thus, the connection members 1250 may pass through the holes 1211 of the lower plate 1210 such that the lower plate 1210 may be coupled to the gaskets 1230 and the end plates 1240.

The upper plate 1220 may be disposed above the secondary battery cells 1100. The upper plate 1220 may include holes 1221 disposed in a longitudinal direction substantially parallel to the arrangement direction of the secondary battery cells 1100. Thus, the upper plate 1220 may be coupled to the gaskets 1230 and the end plates 1240 by the connection members 1250 passing through the holes 1221 thereby fixing the position of the secondary battery cells 1100.

The upper plate 1220 may have holes 1222 disposed in a vertical direction to correspond to the electrodes 1130 of the secondary battery cells 1100. Thus, the electrodes 1130 of the secondary battery cells 1100 may protrude above the upper plate 1220.

The secondary battery cells 1100 may include barrier ribs 1223 around the holes 1222. The barrier ribs 1223 may extend from edges of the upper plate 1220 toward an inside of the upper plate 1220. The barrier ribs 1223 may be repeatedly arranged substantially parallel to the arrangement direction of the secondary battery cells 1100. The barrier ribs 1223 may partition off pairs of electrodes 1130 to which the bus bars 1300 are connected. Thus, the bus bars 1300 may be coupled to pairs of electrodes 1130 disposed between the barrier ribs 1223. The bus bars 1300 adjacent to each other may be electrically insulated from each other by the barrier ribs 1223.

The upper plate 1220 may have a plurality of vent holes 1224 disposed therein. In addition, protrusions 1224*a* may be disposed around the vent holes 1224 and protrude toward the secondary battery cells 1100. The protrusions 1224*a* may be disposed along a circumferences of the vent holes 1224, may correspond to the vents 1121 of the secondary battery cells 1100 and may be coupled to the vents 1121 when the secondary battery module 1000 is properly assembled. Since the vents 1121 may be positioned in the protrusions 1224*a*, when the vents 1121 are opened to discharge gas, the gas may be discharged through the vent holes 1224.

As illustrated in FIGS. 3A and 3B, the vent holes 1224 and the protrusions 1224*a* of the upper plate 1220 may be arranged in a zigzag fashion about the center of the secondary battery cells 1100 of the assembled secondary battery module 1000. If a secondary battery cell 1100 is mis-arranged with reversed polarities of the electrodes 1130, since all of the vents 1121 of the secondary battery cells 1100 are not in the zigzag fashion, the upper plate 1220 cannot be coupled to the secondary battery cells 1100. Therefore, the upper plate 1220 of the module frame 1200 may be correctly coupled to the secondary battery cells 1100 only when the adjacent secondary battery cells 1100 are arranged so that the polarities of the adjacent electrodes 1130 alternate each other. Thus, in the secondary battery module 1000 according to an embodiment, the mis-arrangement of the secondary battery cells 1100 may be advantageously prevented by coupling the protrusions 1224*a* to the vents 1121. Thus, the battery module may be easily assembled and reliability of the battery module may be ensured.

The gaskets 1230 may be disposed at ends of the arranged secondary battery cells 1100. Each of the gaskets 1230 may include holes 1231 through which the connection members 1250 may pass. The gaskets 1230 may be coupled to the lower plate 1210, the upper plate 1220 and the end plates 1240 by the connection members 1250. Thus, the gaskets 1230 may allow the secondary battery cells 1100 and the end plates 1240 to be closely coupled to each other. Moreover, the gaskets 1230 may absorb shock applied to the secondary battery cells 1100.

The end plates 1240 may be disposed outside the gaskets 1230. The end plates 1240 may have holes 1241 through which the connection members 1250 may pass. Thus, the end plates 1240 may apply pressure to the secondary battery cells 1100 by the coupling force of the connection members 1250. The pressure may be applied in the arrangement direction of the secondary battery cells 1100. Thus, the plurality of secondary battery cells 1100 may be securely coupled to each other by the pressure.

The connection members 1250 may be disposed on lateral sides of the secondary battery cells 1100 and in the arrangement direction of the secondary battery cells 1100. The connection members 1250 may press the end plates 1240, applying pressure to the secondary battery cells 1100 and fixing the position of the secondary battery cells 1100. In addition, the connection members 1250 may pass through the holes 1211 of the lower plate 1210, the holes 1221 of the upper plate 1220, the holes 1231 of the gaskets 1230 and the holes 1241 of the end plates 1240 and may be arranged in the arrangement direction of the secondary battery cells 1100. Each of the connection members 1250 may include a connection rod 1251 passing through the holes 1211, 1221, 1231 and 1241 and nuts 1252 engaged with the connection rod 1251.

The diameter of one end of the connection rod 1251 may be larger than the diameter of the holes 1241 of the end plates 1240 so that the end of the connection rods 1251 may be blocked by the holes 1241. A diameter of the other end of the connection rod 1251 may be smaller than the holes 1211, 1221, 1231 and 1241 of the lower plate 1210, the upper plate 1220, the gaskets 1230 and the end plates 1240 so that the other end of the connection rod 1251 may pass through the holes 1211, 1221, 1231 and 1241. The nuts 1252 may be engaged with the other ends of the connection rods 1251 from the outside to apply pressure to the end plates 1240 and to fix the position of the secondary battery cells 1100.

The bus bars 1300 may be disposed on the upper plate 1220 and may be coupled to the electrodes 1130 of the secondary battery cells 1100. The bus bars 1300 may serially connect the secondary battery cells 1100 to each other. In particular, the bus bars 1300 may electrically connect the electrodes 1130 of adjacent secondary battery cells 1100 to each other. The bus bars 1300 may be coupled to the electrodes 1130 of the secondary battery cells 1100 in regions of the upper plate 1220 partitioned by the barrier ribs 1223.

As described above, in the secondary battery module 1000 according to the present embodiment, the vents 1121 may be disposed adjacent to either a positive terminal or a negative terminal of the electrodes 1130 in the plates 1120 of the secondary battery cells 1100, such that the vents 1121 are arranged in a zigzag fashion about the centers of the arranged secondary battery cells 1100. Moreover, in the secondary battery module 1000 according to the present embodiment, the vent holes 1224 and the protrusions 1224a may be disposed in the upper plate 1220 of the module frame 1200 in a zigzag fashion corresponding to the vents 1121. Thus, in the secondary battery module 1000 according to the present embodiment, the protrusions 1224a may be coupled to the vents 1121. If a secondary battery cell 1100 is mis-arranged, the vents 1121 cannot be coupled to the protrusions 1224a so that a worker can easily discover the error and re-assemble the secondary battery module 1000. Therefore, reliability of the secondary battery module 1000 may be ensured.

Alternatively, the adjacent secondary battery cells 1100 may be connected in parallel, e.g., the polarities of the electrically connected adjacent electrodes of the secondary battery cells 1100 may be the same. The vents 1121 may be linearly aligned and the module frame 1200 may include the vent holes 1224 and the protrusions 1224a disposed to correspond to the linearly arranged vents 1121.

Figure 4A:
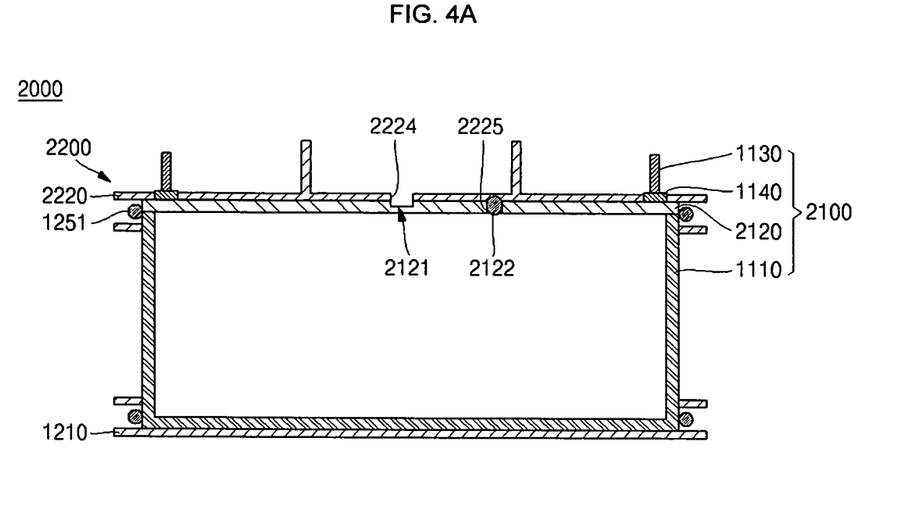
FIGS. 4A and 4B illustrate sectional views of secondary battery cells adjacent to each other in a secondary battery module according to another embodiment.
Figure 4B:
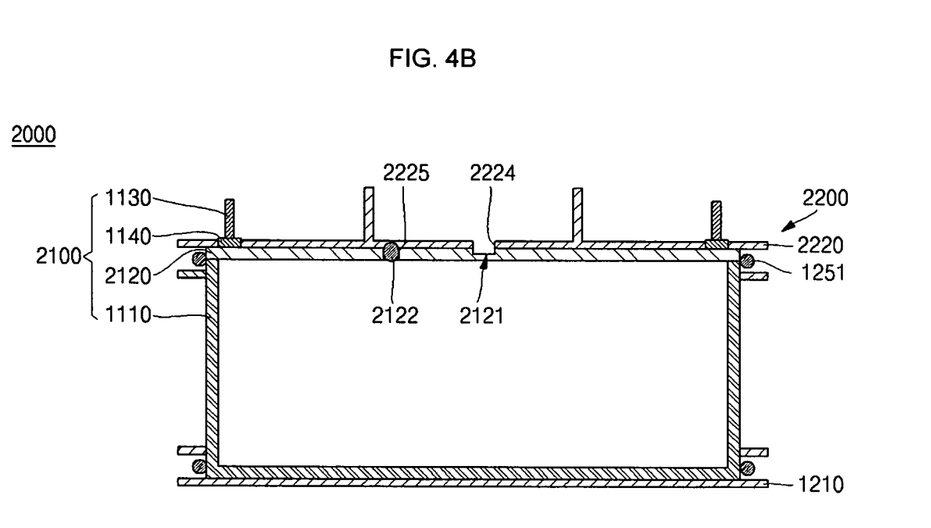

Hereinafter, configuration of a secondary battery module 2000 according to another embodiment will be described. FIGS. 4A and 4B illustrate sectional views of secondary battery cells adjacent to each other in a secondary battery module according to the embodiment. The same reference numerals are assigned to the components having the same configurations and operations as those in the previously described embodiment, and this embodiment will be described by concentrating on differences from the previous embodiment.

As illustrated in FIGS. 4A and 4B, the secondary battery module 2000 according to the present embodiment may include secondary battery cells 2100, a module frame 2200 and bus bars (not shown). Each of the secondary battery cells 2100 may include a case 1110, a plate 2120 on an upper side of the case 1110 and electrodes 1130. Each of the secondary battery cells 2100 may also include nuts 1140 engaged with the electrodes 1130.

Each of the plates 2120 may be disposed on the upper side of the case 1110. Each of the plates 2120 may include a vent 2121. The vent 2121 is a structure for discharging gas from the case, and may be disposed at a center of an upper side of the plate 2120.

The plate 2120 may include an injection hole stopper 2122 disposed on the upper side thereof. The injection hole stopper 2122 may seal an injection hole for injecting electrolyte after inserting the electrode assembly into the case 1110 and disposing the plate 2120 thereon. The injection hole stopper may be formed by, e.g., welding and may be thicker than the plate 2120. In other words, the injection hole stopper 2122 may protrude above the plate 2120.

In addition, the injection hole stopper 2122 may be disposed adjacent to one of the electrodes 1130 on the secondary battery cell 2100. The secondary battery cells 2100 for a serial connection may be arranged such that the polarities of the adjacent electrodes 1130 of adjacent battery cells 2100 alternate relative to each other. Thus, the injection hole stoppers 2122 may be arranged in a zigzag fashion about the centers of the properly arranged secondary battery cells 2100.

The module frame 2200 may include a lower plate 1210, an upper plate 2220 disposed on an upper side of the secondary battery cells 2100, end plates (not shown) and connection members 1251. The module frame 2200 may further include gaskets disposed between the secondary battery cells 2100 and the end plates 1240.

The upper plate 2220 may be disposed on the secondary battery cells 2100. The upper plate 2220 may be coupled to the plates 2120 of the secondary battery cells 2100. The upper plate 2220 may include vent holes 2224 corresponding to the vents 2121 of the secondary battery cells 2100. Thus, gas discharged when the vents 2121 are opened may be discharged out of the vent holes 2224.

In addition, the upper plate 2220 may include accommodating recesses 2225 corresponding to the injection hole stoppers 2122 of the secondary battery cells 2100. The accommodating recesses 2225 may correspond to the arrangement of the injection hole stoppers 2122 in a zigzag fashion about the center of the properly arranged secondary battery cells 2100. The injection hole stoppers 2122 of the secondary battery cells 2100 may be coupled to the accommodating recesses 2225 of the upper plate 2220. Thus, if even one of the electrodes 1130 of the secondary battery cells 2100 is mis-arranged with reversed polarities, the injection hole stoppers 2122 of the secondary battery cells 2100 will not be arranged in the zigzag fashion and will not be able to be coupled to the accommodating recesses 2225 of the upper plate 2220. Thus, the mis-arrangement of the secondary battery cells 2100 may be easily checked and corrected during assembly of the secondary battery module 2000.

The secondary battery module 2000 according to the present embodiment may include the injection hole stoppers 2122 disposed adjacent to alternating electrodes 1130 on adjacent secondary battery cells 2100. The secondary battery module 2000 may also include the accommodating recesses 2225 disposed on a lower side of the upper plate 2220 and corresponding to the injection hole stoppers 2122 in a zigzag fashion. The injection hole stoppers 2122 may be coupled to the corresponding accommodating recesses 2225. Thus, if even one of the secondary battery cells 2100 is mis-arranged, the injection hole stoppers 2122 will not be able to be coupled to the accommodating recesses 2225 so that the mis-arrangement of the secondary battery cells 2100 may be easily discovered and corrected. Therefore, reliability of the secondary battery module 2000 may be ensured.

Figure 5A:
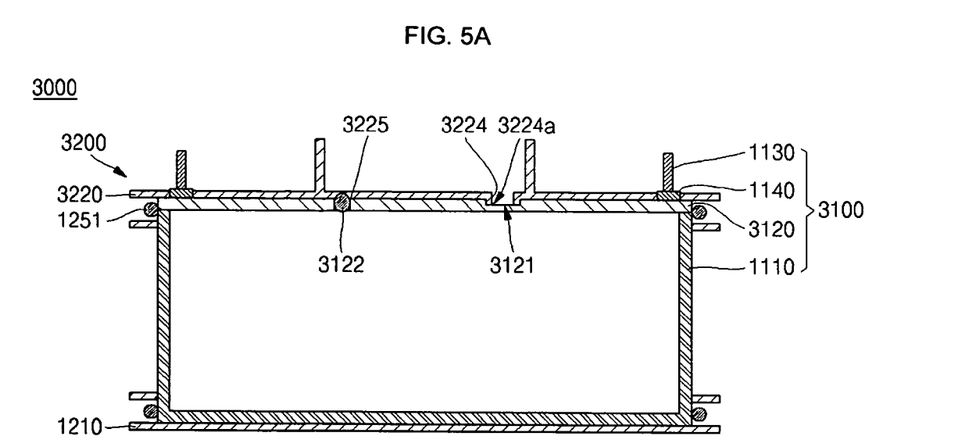
FIGS. 5A and 5B illustrate sectional views of secondary battery cells adjacent to each other in a secondary battery module according to still another embodiment.
Figure 5B:
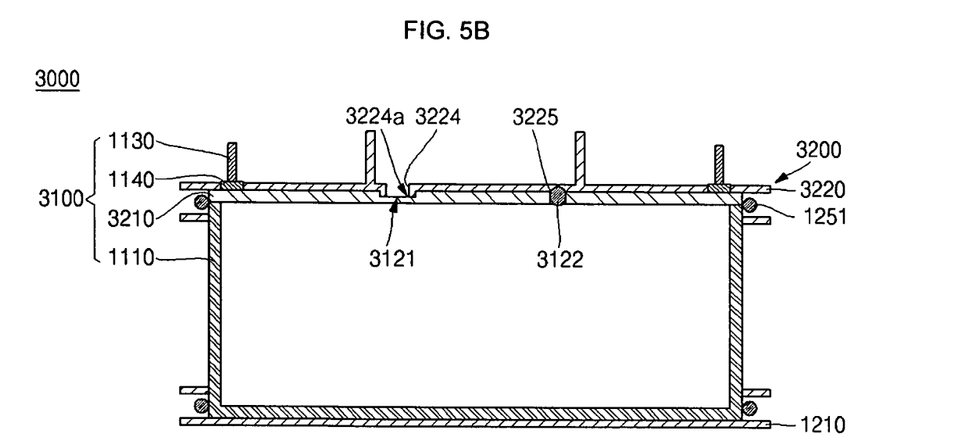

Hereinafter, configuration of a secondary battery module 3000 according to still another embodiment will be described. FIGS. 5A and 5B illustrate sectional views of secondary battery cells adjacent to each other in a secondary battery module according to the embodiment. The same reference numerals are assigned to the components having the same configurations and operations as those in the previously described embodiments, and this embodiment will be described by concentrating on differences from the previous embodiments.

Referring to FIGS. 5A and 5B, the secondary battery module 3000 according to the present embodiment may include secondary battery cells 3100, a module frame 3200 and bus bars (not shown). Each of the secondary battery cells 3100 may include a case 1110, a plate 3120, electrodes 1130 and nuts 1140.

Each of the plates 3120 may be disposed on an upper side of the case 1110. The plate may have a vent 3121 disposed adjacent to one of the electrodes 1130. The plate 3120 may include an injection hole stopper 3122 disposed adjacent to the other electrode 1130 of the secondary battery cell 3100. Thus, when the secondary battery cells 3100 adjacent to each other are properly arranged such that polarities of the electrodes 1130 alternate relative to each other, the vents 3121 may be arranged in a zigzag fashion about the center of the secondary battery cell 3100; and the injection hole stoppers 3122 may also be arranged in a zigzag fashion opposite to the vents 3121.

The module frame 3200 may be disposed on the secondary battery cells 3100. The module frame 3200 may be coupled to the plates 3120 of the secondary battery cells 3100. The module frame 3200 may include a lower plate 1220, an upper plate 3220 disposed on the secondary battery cells 3100, end plates (not shown) and connection members 1251. The module frame may further include gaskets disposed between the end plates and the secondary battery cells 3100.

The upper plate 3220 may include vent holes 3224, protrusions 3224a disposed around the vent holes 3224 and accommodating recesses 3225. The protrusions 3224a may be arranged to correspond to the vents 3121, and the accommodating recesses 3225 may be arranged to correspond to the injection hole stoppers 3122. The vent holes 3224 and the protrusions 3224a of the upper plate 3220 may correspond to the vents in the arrangement direction of the secondary battery cells 3100 and be arranged in a zigzag fashion. Also, the accommodating recesses 3225 of the upper plate 3220 may be arranged opposite to the vent holes 3224 and the protrusions 3224a, also in a zigzag fashion. Thus, when the secondary battery cells 3100 are properly arranged adjacent to each other such that the polarities of the electrodes 1130 alternate, the vents 3121 and the injection hole stoppers 3122 may be coupled to the protrusions 3224a and the accommodating recesses 3224, respectively. If even one of the secondary battery cells 3100 is mis-arranged, the vents 3121 will not be coupled to the protrusions 3224a and the injection hole stoppers 3122 will not be disposed in the accommodating recesses 3225. Accordingly, the error in arrangement may be easily detected and corrected. The secondary battery module 300 according to the present embodiment may thereby allow for a secure connection between the secondary battery cells 3100, so that the reliability of a secondary battery module may be improved.

Figure 6:
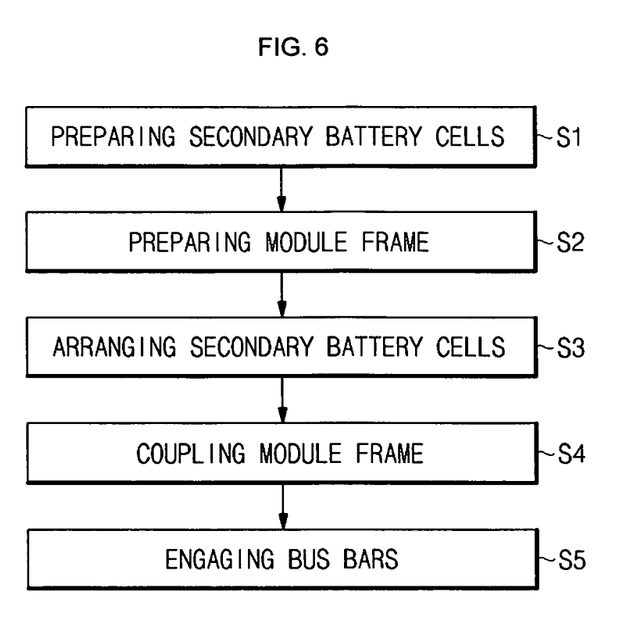
FIG. 6 illustrates a flowchart showing a method of fabricating a secondary battery module according to an embodiment.

Hereinafter, a method of fabricating the secondary battery module 1000 according to an embodiment will be described. FIG. 6 illustrates a flowchart of a method of fabricating the secondary battery module 1000 according to an embodiment.

Referring to FIG. 6, a method of fabricating the secondary battery module 1000 according to an embodiment may include preparing secondary battery cells (S1), preparing a module frame (S2), arranging the secondary battery cells (S3), coupling the module frame (S4) and engaging the bus bars (S5). Hereinafter, the steps of FIG. 6 will be described with reference to FIGS. 1 to 3B.

In the preparation of the secondary battery cells (S1), a plurality of secondary battery cells 1100 may be prepared. In each of the secondary battery cells 1100, an electrode assembly (not shown) may be disposed in a case 1110; and a plate 1120 may seal the upper side of the case 1110. The electrodes 1130 may be connected to the electrode assembly and protrude from the plate 1120. Each of the plates 1120 may have vents 1121 disposed on an upper side thereof, adjacent to one of the electrodes 1130. On the upper side of each of the plates 1120, an injection hole stopper 1122 may be provided to seal an injection hole, through which electrolyte (not shown) may be injected into the case 1110.

In the preparation of a module frame (S2), a module frame 1200 for surrounding the outsides of the secondary battery cells 110 may be prepared. In the preparation of the module frame (S2), the module frame 1200 may include a lower plate 1210, an upper plate 1220, end plates 1240 and connection members 1250. The module frame 1200 may further include gaskets 1230. Components of the module frame 1200, particularly the upper plate 1220, may include vent holes 1224 and protrusions 1224a which correspond to the vents 1121 of the secondary battery cells 1110. The vent holes 1224 and the protrusions 1224a may be arranged in a zigzag fashion to correspond to the proper arrangement of the secondary battery cells 1100.

In the arrangement of the secondary battery cells (S3), the secondary battery cells 1100 are arranged in a first direction.

In the arrangement of the secondary battery cells (S3), the secondary battery cells 1100 may be arranged such that the polarities of adjacent electrodes 1130 of adjacent secondary battery cells 1100 alternate relative to each other and the vents 1121 adjacent to the electrodes 1130 are thereby arranged in a zigzag fashion.

In the coupling of the module frame (S4), outsides of the secondary battery cells 1100 may be surrounded with the module frame 1200. The module frame 1200 may be assembled to the secondary battery cells 1100 such that the lower plate 1210, the upper plate 1220, the gaskets 1230 and the end plates 1240 are coupled to lower sides, upper sides and lateral sides of the secondary battery cells 1100, respectively. The module frame 1200 may be assembled by the connection members 1250 passing through the holes 1211, 1221, 1231 and 1241 of the lower plate 1210, the upper plate 1220, the gaskets 1230 and the end plates 1240.

Because the vent holes 1224 and the protrusions 1224a corresponding to the vents 1121 may be disposed in the lower side of the upper plate 1220, the protrusions 1224a may fit in and couple to the vents 1121. If the protrusions 1224a are not coupled to the vents 1121 during assembly, a worker may easily determine that at least one of the secondary battery cells 1100 is mis-arranged, with reversed polarities of the electrodes 1130, and correct the issue so that workability may be improved and the reliability of products may be enhanced.

In the engagement of the bus bars (S5), the electrodes 1130 protruding from the module frame 1200 may be connected to each other with the bus bars 1300. Since the secondary battery cells 1100 may be arranged such that the polarities of adjacent electrodes 1230 of adjacent secondary battery cells 1100 alternate relative to each other, the bus bars 1300 may electrically connect the adjacent electrodes 1130. Thus, due to the serial connection in the engagement of the bus bars (S5), the secondary battery module 1000 according to the embodiment may generate a desired voltage.

Alternatively, although not depicted, the vent holes 1224 and the protrusions 1224a may be disposed linearly during the preparation of the module frame (S2). The arranging of the secondary battery cells (S3) may be such that the electrodes 1130 of the secondary battery cells 1100 which have the same polarity are arranged adjacent to each other, thereby aligning the vents 1121 linearly. Thus, in the coupling of the module frame (S4), the vents 1121 may be coupled to the protrusions 1124a; and the secondary battery cells 1100 may be connected in parallel.

Although not depicted, the secondary battery module 2000 according to another embodiment may be fabricated by a process of preparing the secondary battery cells 2100 having injection hole stoppers 2122 protruding from upper sides of plates 2120 (S1), preparing a module frame 200 having accommodating recesses 2225 disposed on a lower side of an upper plate 2220 (S2), and coupling the module frame 200 such that the injection hole stoppers 2122 of the secondary battery cells 2100 are coupled to the accommodating recesses 2225 of the upper plate 2220 (S4), sequentially.

Also, a secondary battery module 3000 according to still another embodiment may be fabricated by a process of preparing secondary battery cells 3100 with vents 3121 and injection hole stoppers 3122 disposed on upper sides of plates 3120 (S1); preparing a module frame 3200 with vent holes 3224, protrusions 3224a and accommodating recesses 3225 disposed on a lower side of an upper plate 3220 (S2); and coupling the module frame 3200 such that the vents 3121 and the injection hole stoppers 3122 of the secondary battery cells

3100 are coupled to the protrusions 3224a and the accommodating recesses 3225 of the upper plate 3220, respectively (S4).

Typically, methods of preventing secondary battery cells from being mis-arranged by designing a bus bar and a peripheral gasket are used in order to check the polarity of a battery cell. However, since the number of parts may increase and the structure of the battery cell may be more complicated, it is difficult to actually apply the methods.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery module, comprising:
    a plurality of secondary battery cells, each secondary battery cell including electrodes on one side thereof and a vent on the same side as the electrodes;
    a module frame coupled to the plurality of secondary battery cells and fixing the secondary battery cells in a predetermined arrangement, the module frame including:
        a plurality of vent holes corresponding to the vents of the secondary battery cells, and
        protrusions disposed around the vent holes and protruding toward the vents,
    wherein each vent of the secondary battery cells is coupled to one of the protrusions of the module frame.

2. The secondary battery module as claimed in claim 1, further comprising at least one bus bar disposed on the module frame and electrically connecting an electrode of one of the secondary battery cells to an adjacent electrode of an adjacent secondary battery cell.

3. The secondary battery module as claimed in claim 1, wherein:
    each electrode has a polarity, and
    the secondary battery cells are arranged such that the polarity of an electrode of one secondary battery cell is different from the polarity of an adjacent electrode on an adjacent secondary battery cell.

4. The secondary battery module as claimed in claim 1, wherein:
    the secondary battery cells each have a center, and
    the secondary battery cells are arranged such that the vents are aligned in a zigzag fashion about the centers of the secondary battery cells.

5. The secondary battery module as claimed in claim 1, wherein the module frame includes:
    a lower plate disposed under the secondary battery cells and supporting the secondary battery cells;
    an upper plate disposed above the secondary battery cells and including the vent holes and the protrusions;
    end plates disposed at ends of the secondary battery cells; and
    connection members connecting the lower plate, the upper plate and the end plates to each other and fixing the secondary battery cells in the predetermined arrangement.

6. The secondary battery module as claimed in claim 1, wherein:
    the module frame has an inner surface, and
    the protrusions of the module frame protrude from the inner surface of the module frame toward the secondary battery cells.

7. The secondary battery module as claimed in claim 6, wherein the protrusions of the module frame are fitted into the vents.

8. The secondary battery module as claimed in claim 1, wherein each secondary battery cell includes upper lateral sides and the electrodes are disposed on the upper lateral sides.

9. The secondary battery module as claimed in claim 1, wherein each secondary battery cell includes upper lateral sides and the electrodes are disposed on the upper lateral sides.

10. A secondary battery module, comprising:
    a plurality of secondary battery cells, each secondary battery cell including electrodes on one side thereof and an injection hole stopper on the same side as the electrodes; and
    a module frame coupled to the plurality secondary battery cells and fixing the secondary battery cells in a predetermined position, the module frame including a plurality of accommodating recesses corresponding to the injection hole stoppers of the secondary battery cells, wherein each injection hole stopper of the secondary battery cells is coupled to one of the accommodating recesses of the module frame.

11. The secondary battery module as claimed in claim 10, further comprising at least one bus bar disposed on the module frame and electrically connecting an electrode of one of the secondary battery cells to an adjacent electrode of an adjacent secondary battery cell.

12. The secondary battery module as claimed in claim 10, wherein:
    the secondary battery cells each have a center and an upper side,
    each injection hole stopper protrudes from the upper side of each secondary battery cell, and
    the secondary battery cells are arranged such that the injection hole stoppers are aligned in a zigzag fashion about the centers of the secondary battery cells.

13. The secondary battery module as claimed in claim 10, wherein the module frame includes:
    a lower plate disposed under the secondary battery cells and supporting the secondary battery cells;
    an upper plate disposed above the secondary battery cells and including the accommodating recesses;
    end plates disposed at ends of the secondary battery cells; and
    connection members connecting the lower plate, the upper plate and the end plates to each other and fixing the secondary battery cells in the predetermined arrangement.

14. The secondary battery module as claimed in claim 10, wherein:
    each secondary battery cell includes a vent disposed adjacent to another of the electrodes,
    the module frame includes a plurality of vent holes corresponding to the vents of the secondary battery cells and protrusions disposed around the vent holes and protruding toward the vents, and
    each vent of each secondary battery cell is coupled to one of the protrusions of the module frame.

15. The secondary battery module as claimed in claim 14, wherein:
- the secondary battery cells each have a center and an upper side,
- each injection hole stopper protrudes from the upper side of each secondary battery cell, and
- the secondary battery cells are arranged such that the injection hole stoppers are aligned in a zigzag fashion about the centers of the secondary battery cells and the vents are aligned in an opposite zigzag fashion about the centers of the secondary battery cells.

* * * * *